United States Patent
Watanabe

(10) Patent No.: US 10,353,647 B2
(45) Date of Patent: Jul. 16, 2019

(54) PRINTING CONTROL APPARATUS, PRINTING CONTROL METHOD, AND STORAGE MEDIUM

(71) Applicant: CANON KABUSHIKI KAISHA, Tokyo (JP)

(72) Inventor: Tomoaki Watanabe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/668,285

(22) Filed: Aug. 3, 2017

(65) Prior Publication Data
US 2018/0046416 A1    Feb. 15, 2018

(30) Foreign Application Priority Data

Aug. 12, 2016 (JP) .................. 2016-158618
Jun. 30, 2017 (JP) .................. 2017-129142

(51) Int. Cl.
*G06F 3/12* (2006.01)

(52) U.S. Cl.
CPC .......... *G06F 3/1207* (2013.01); *G06F 3/1204* (2013.01); *G06F 3/1237* (2013.01); *G06F 3/1264* (2013.01); *G06F 3/1285* (2013.01); *G06F 3/1206* (2013.01); *H04N 2201/0046* (2013.01)

(58) Field of Classification Search
CPC .............................. G06F 3/1207; G06F 3/1237
See application file for complete search history.

(56) References Cited

U.S. PATENT DOCUMENTS

| 9,361,055 B2 | 6/2016 | Watanabe | |
| 2007/0164554 A1* | 7/2007 | Krone | B42D 15/02 283/56 |
| 2009/0279114 A1 | 11/2009 | Sakurai | |
| 2010/0253979 A1* | 10/2010 | Hino | G06F 3/1204 358/1.15 |
| 2012/0154871 A1* | 6/2012 | Oba | G06K 15/021 358/1.18 |
| 2013/0286410 A1* | 10/2013 | Yasinover | H04N 1/387 358/1.2 |

FOREIGN PATENT DOCUMENTS

| JP | 2006-301742 | 11/2006 |
| JP | 2009-269310 | 11/2009 |
| JP | 2013-239818 | 11/2013 |

* cited by examiner

*Primary Examiner* — Ibrahim Siddo
(74) *Attorney, Agent, or Firm* — Venable LLP

(57) ABSTRACT

A printing control apparatus performs a layout processing that generates print data on which data of products and data of a work instruction sheet are laid out based on information on first post-processing performed for a plurality of printout sheets that are printed using the generated print data, and instructs a printer to print the generated print data on the plurality of printout sheets. In the layout processing, the data of the products and the data of the work instruction sheet are laid out based on an order that the products and the work instruction sheet are discharged from the first post-processing, so that the work instruction sheet discharged from the first post-processing is output on the products discharged from the first post-processing in a piled state as the results of performing the first post-processing for the plurality of printout sheets on which the generated print data is printed.

17 Claims, 10 Drawing Sheets

FIG.6

| JOB ID | SUBJECT MATTER | DEVICE NAME | STATUS |
|---|---|---|---|
| 00000023 | MANUAL 1 | PRINTER 1 | ALREADY TRANSMITTED |
| 00000122 | MANAGEMENT TECHNIQUE | PRINTER 1 | ALREADY TRANSMITTED |
| 00000123 | MANAGEMENT TECHNIQUE | PRINTER 1 | ALREADY TRANSMITTED |
| 00004312 | OPERATION MANUAL | PRINTER 2 | ALREADY TRANSMITTED |
| 00000023 | MANUAL 1 | STITCHING MACHINE | ALREADY TRANSMITTED |
| 00000176 | MANUAL 3 | PRINTER 1 | ALREADY TRANSMITTED |
| 00000537 | BUSINESS CARD | PRINTER 3 | ALREADY TRANSMITTED |
| 00005002 | OPERATION MANUAL B | PRINTER 2 | ALREADY TRANSMITTED |
| 00005002 | OPERATION MANUAL B | STITCHING MACHINE | ALREADY TRANSMITTED |
| 00000176 | BUSINESS CARD | CUTTING MACHINE | NOT TRANSMITTED YET |
| 00000012 | User Guide | STITCHING MACHINE | NOT TRANSMITTED YET |
| 00000012 | User Guide | PRINTER 1 | NOT TRANSMITTED YET |
| 00004312 | OPERATION MANUAL | STITCHING MACHINE | NOT TRANSMITTED YET |

PRINTING CONTROL APPARATUS, PRINTING CONTROL METHOD, AND STORAGE MEDIUM

BACKGROUND OF THE INVENTION

Field of the Invention

The present invention relates to a printing control technique in a printing system that obtains a product by performing processing for printout matter after printing.

Description of the Related Art

Due to improvement of the image forming apparatus and the printing-related technique, such as digitization of a printing order reception method, on-demand printing is prevailing in production sites. In the on-demand printing, the production method and the delivery destination of a product in accordance with a request may be different for each product, and therefore, in order to prevent a mistake, information accompanying printing is printed on a sheet different from printout matter. This sheet is called a "work instruction sheet" or the like and on which information on the work contents in each post-processing process, the delivery destination, and so on is described. An operator of post-processing prevents a work mistake or erroneous delivery by performing the work while watching the work instruction sheet.

Further, in recent years, at the time of printing of printout matter (work-in-process) before post-processing in on-demand printing, there is a case where a work instruction sheet is output at the same time from the same sheet discharge port and this sheet is used as a partition sheet of the work-in-process. In the production process, by moving the work-in-process with a work instruction sheet thereon to a device to perform post-processing, such as cutting and stitching for binding, it is possible for an operator to perform work in each post-processing process efficiently. It is common to print the work instruction sheet on a normal-sized sheet, such as an A4 sheet and a B5 sheet.

Further, in the on-demand printing, there exists a technique to efficiently arrange products on a sheet by using so-called prepress software. For example, Japanese Patent Laid-Open No. 2013-239818 has described a technique to reduce the number of wasted sheets by cutting into individual products after performing printing in the state where a plurality of products, such as delivery slips and chits, is laid out on one normal-sized sheet.

Japanese Patent Laid-Open No. 2013-239818 described above has described a reduction in the number of wasted sheets by laying out a plurality of products on one sheet. However, a work instruction sheet to specify work contents of the next process in the post-processing and a delivery destination is not taken into consideration.

As described above, it is common to print a work instruction sheet on a normal-sized sheet and a different work instruction sheet is printed for each of a plurality of products. At this time, it is necessary to correctly combine each of a plurality of products for which post-processing has been completed with a work instruction sheet corresponding to the product. For example, a case is considered where documents corresponding to a plurality of pamphlets (e.g., three pamphlets) are laid out, printed, and cut in a pamphlet production site. In this case, works-in-process corresponding to three pamphlets are produced, and therefore, it is necessary to search for the work instruction sheet corresponding to each work-in-process, to combine the work-in-process and a corresponding work instruction sheet, and to send them to the next process in the post-processing in this state. Because of this, it is necessary to perform the work to check and collate the combination of the work-in-process (or product) and the work instruction sheet based on the features of the work-in-process after printing and cutting and identification information, such as a barcode attached outside a register mark (a cut line that is a reference at the time of cutting). The work to collate the work instruction sheet with the work-in-process is work that takes time and effort for an operator, causing a mistake.

Further, after the collation between the work instruction sheet and the work-in-process, it is common to pile the work instruction sheet and the work-in-process on the work table of the next process in the state where the work instruction sheet and the work-in-process are piled. At this time, in the case where, for example, a small work-in-process, such as a business card and a ticket, and a normal-sized work instruction sheet are piled, it may occur that the balance is broken and they fall down. Consequently, it is necessary to pay attention so that an operator can correctly grasp the correspondence relationship between the work-in-process and the work instruction sheet and that both are prevented from entering a separated state.

An object of the present invention is to provide a mechanism of printing control that improves work efficiency and suppresses occurrence of a human mistake by reducing the burden of an operator in collation between a work instruction sheet and a work-in-process (product) in on-demand printing and the like.

SUMMARY OF THE INVENTION

The printing control apparatus according to the present invention is a printing control apparatus including: a memory for storing a computer program; and a processor for executing the computer program to: perform layout processing for, based on information on first post-processing to be performed for printout matter, print data relating to the printout matter and print data relating to a work instruction sheet to be used in work in a post stage; and instruct a printer to print the print data of the printout matter and the work instruction sheet for which the layout processing has been performed, and in the layout processing, the print data of the printout matter and the work instruction sheet is laid out so that the printout matter and the work instruction sheet after the first post-processing are output in a piled state as the results of performing the first post-processing for the printout matter and the work instruction sheet printed by the printer.

Further features of the present invention will become apparent from the following description of exemplary embodiments with reference to the attached drawings.

BRIEF DESCRIPTION OF THE DRAWINGS

FIG. 6 is a diagram showing an example of a UI screen of a POD application 220;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

In the present embodiment, explanation is given by taking a POD (Print On Demand) printing system as an example in which an order is received from the outside (PC terminal and the like of a person who places the order) via a network and books or the like are produced in accordance with the order. Further, in the present embodiment, as a scene in which collation between a work instruction sheet and a work-in-process may be problematic, the case is explained as an example where an order is placed to produce a pamphlet or the like for which saddle stitch binding is specified as a product. However, it is possible to widely apply the present invention to a printing system using a work instruction sheet and the present invention is not limited to the POD printing system.

Figure 1:
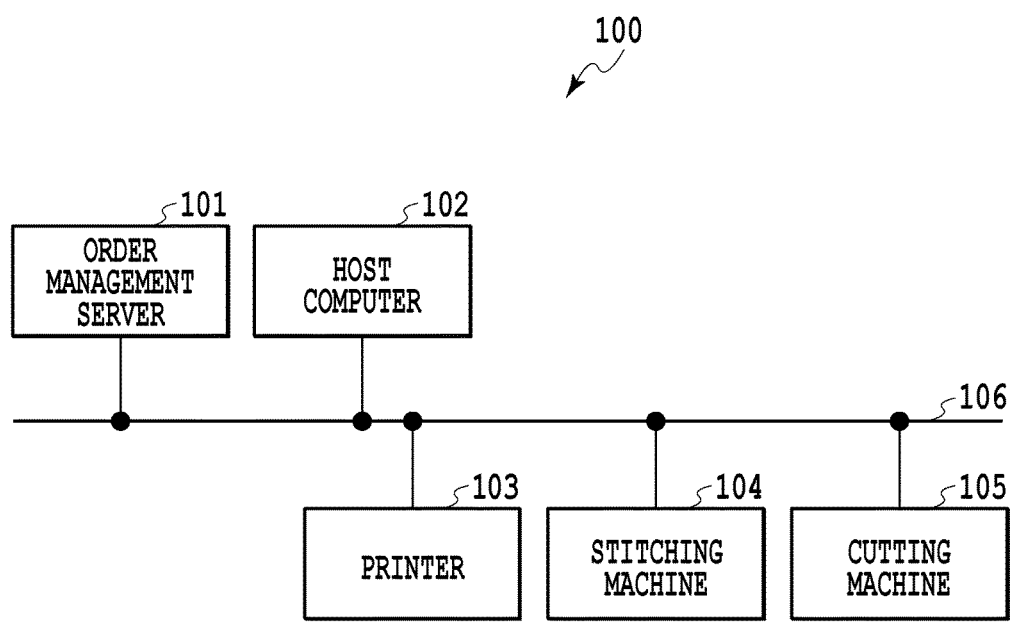
FIG. 1 is a diagram showing a configuration example of a POD printing system.

FIG. 1 is a diagram showing a configuration example of a POD printing system. A POD printing system 100 includes an order management server 101, a host computer (host PC) 102, a printer 103, a stitching machine 104, and a cutting machine 105, and these are connected to one another via a network 106.

The order management server 101 manages an order (printing request) placed from an external device (e.g., client PC and the like), not shown schematically, connected to the network 106 by making use of the Web service or the like of on-demand printing. The host PC 102 functions as a printing control apparatus that performs various kinds of control to obtain a product in accordance with a printing request in the present embodiment. The host PC 102 gives production instructions in accordance with the work contents that are performed by each unit to the printer 103, the stitching machine 104, and the cutting machine 105 based on information (hereinafter, "request information") relating to the data of a product in accordance with the request received from the order management server 101 and details of the request contents. The printer 103 performs processing to print the work instruction sheet described previously, besides the printout matter that is the prototype of a product, such as a book and a pamphlet, in accordance with the request based on printing instructions (print job) received from the host PC 102. The stitching machine 104 performs center-folding processing to center-fold the printout matter and stapling processing to staple the specified number of staples at the center portion of the printout matter as first post-processing for the printout matter (printout matter for which impositioning has been performed for saddle stitch binding) output from the printer 103. It may also be possible for the printer 103 and the stitching machine 104 to be made up as one unit. In this case, the printer 103 itself has, as a post-processing function, a saddle stitch binding function that is a combination of the center-folding function and the stapling function, in addition to the printing function, and performs both the center-folding processing and the stapling processing for the printout matter that is printed and outputs the printout matter (work-in-process) in the state of being saddle stitched. The cutting machine 105 performs processing (second post-processing) to cut the printout matter output from the printer 103 and the work-in-process saddle stitched by the stitching machine 104 (or the optional function of the printer) along the specified line (register mark) based on the production instructions from the host PC 102. Due to this, a product (finished product) is created, such as a book and a pamphlet whose edge is cut neatly by cutting the edge of the saddle stitched work-in-process, or a small product (e.g., ticket and business card) by cutting a sheet (printout matter) into a plurality of portions, as will be explained in the second embodiment. It is supposed that production instructions to the stitching machine 104 and the cutting machine 105 are given from the host PC 102, but this is not limited. For example, a configuration may be accepted in which parameters and the like relating to production are input directly from a user through the operation panel and the like of the stitching machine 104 or the cutting machine 105. Further, in the case of a small-scale POD printing system, it may be possible for the order management server 101 and the host computer 102 to be the same unit. Furthermore, the printer 103, the stitching machine 104, and the cutting machine 105 may be connected in plurality, respectively, in accordance with the scale of the POD printing system. A rough flow of the printing processing in the above-described POD printing system 100 is as follows.

1) Receive a printing request by the order management server 101.

2) A user (operator) checks and selects request contents on the application screen of the host PC 102 and presses down a production start button.

3) Upon receipt of instructions to start production, the host PC 102 generates work instruction sheet data as well as downloading data and the like of a product in accordance with the request from the order management server 101.

4) On the completion of the work instruction sheet data, the host PC 102 transmits the production instructions to the printer 103 and the post-processing machines (here, the stitching machine 104 and the cutting machine 105).

5) The operator brings the work instruction sheet and printout matter output from the printer 103 to each post-processing machine and performs the post-processing specified for the printout matter in accordance with the work instruction sheet.

Figure 2:
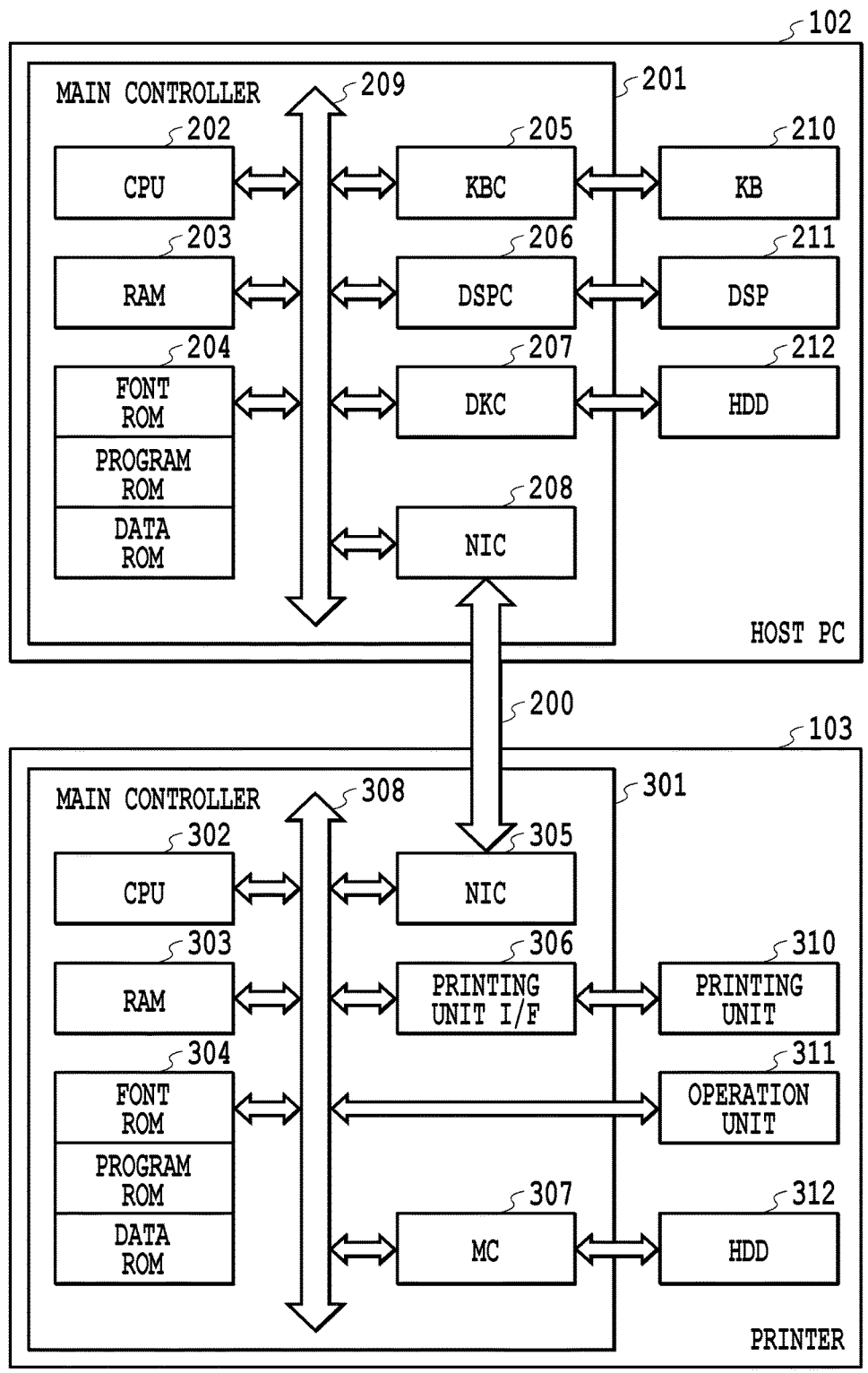
FIG. 2 is a function block diagram showing a hardware configuration of a host PC and a printer in the POD printing system.

FIG. 2 is a function block diagram showing a hardware configuration of the host PC and the printer in the POD printing system. The following configuration is an example and any configuration may be accepted as long as the configuration can perform these functions even in the case where the configuration includes a single device, or the configuration includes a plurality of devices, or the configuration is connected via a network, such as a LAN and a WAN, and thus processing is performed.

First, the host PC is explained. The host PC 102 includes a controller 201, a keyboard 210, a display 211, and an HDD 212. Further, the main controller 201 includes a CPU 202, a RAM 203, a ROM 204, a keyboard controller 205, a display controller 206, a disk controller 207, and a network interface card 208. Then, each of these units is connected to one another via a system bus 209. The CPU 202 is a processor that centralizedly controls each unit within the main controller 201. The RAM 203 functions as a main memory, a work area, and so on of the CPU 202. The ROM 204 is a read-only memory that stores various kinds of data and includes a font ROM, a program ROM, and a data ROM. The CPU 202 performs various kinds of processing, such as processing of a document in which graphics, images, characters, tables (including spread sheets and the like), and so on are included mixedly and printing control processing, based on programs stored in the program ROM or the HDD 212. In the program ROM or the HDD 212, an operating system program (hereinafter, OS), which is a control program of the CPU 202, a printer driver, to be described later, and so on are stored. Then, in the font ROM or the HDD 212, font data and the like to be used for the document processing is stored and in the data ROM or HDD 212, various kinds of data to be used at the time of performing the document processing and the like are stored. The keyboard controller (KBC) 205 controls a key input from the keyboard 210 or a pointing device, not shown schematically. The display controller (DSPC) 206 controls a display of the display (DSP) 211. The disk controller (DKC) 207 controls access to the HDD 212. The HDD 212 stores various programs and the like including a boot program, various applications, font data, user files, edited files, and a printer control command generation program (printer driver). The HDD 212 may be any comparatively large capacity storage device, and may be another kind of storage device, such as an SSD. The network interface card (NIC) 208 performs control of communication with a device via the network 106. It is made possible for the host PC 102 to perform bidirectional communication with the order management server 101, the printer 103, the stitching machine 104, and the cutting machine 105 via the NIC 208.

Next, the printer 103 is explained. The printer 103 includes a main controller 301, a printing unit (printer engine) 310, an operation unit 311, and an HDD 312. Further, the main controller 301 includes a CPU 302, a RAM 303, a ROM 304, a NIC 305, a printing unit interface (I/F) 306, and a memory controller (MC) 307. Then, each of these units is connected to one another via a system bus 308. The CPU 302 is a processor that centralizedly controls each unit within the main controller 301. The RAM 303 functions as a main memory, a work area, and so on of the CPU 302. Further, the RAM 303 is used as a print data loading area and an environmental data storage area and part of the RAM 303 is made up of an NVRAM (Non-Volatile RAM). The ROM 304 is a read-only memory that stores various kinds of data and includes a font ROM, a program ROM, and a data ROM. The CPU 302 outputs an image signal to the printing unit 310 based on the control programs and the like stored in the program ROM of the ROM 304 or the HDD 312. Then, in the program ROM, control programs and the like of the CPU 302 are stored and in the font ROM, font data and the like to be used at the time of generating an image signal is stored. Further, in the data ROM, in the case of the printing apparatus that does not have an external memory, such as the HDD 312, information and the like that is made use of on the host PC 102 is stored. The HDD 312 may be any comparatively large capacity storage device and may be another kind of storage device, such as an SSD. The access control of the HDD 312 is performed by the MC 307. The HDD 312 is connected optionally and stores font data, emulation programs, form data, and so on. Further, the HDD 312 as an external memory is not limited to one and may be provided in plurality. For example, it may also be possible to design a configuration in which a plurality of external memories storing optional fonts of an optional card, in addition to built-in fonts, and programs to interpret printer control languages whose language systems are different can be connected. Further, it may also be possible to have an NVRAM, not shown schematically, and to store printer mode setting information from the operation unit 311. The printing unit I/F 306 controls the printing unit 310. The operation unit 311 includes a liquid crystal display device and the like having, for example, a touch panel function and further, on the operation unit 311, switches for a user to perform various operations, LED indicators, and so on are arranged. The NIC 305 performs control of communication with a device via the network 106. It is made possible for the CPU 214 to perform processing to communicate with the host PC 102 via the NIC 305, and therefore, it is possible to notify the host PC 102 of information and the like within the printer 103.

Figure 3:
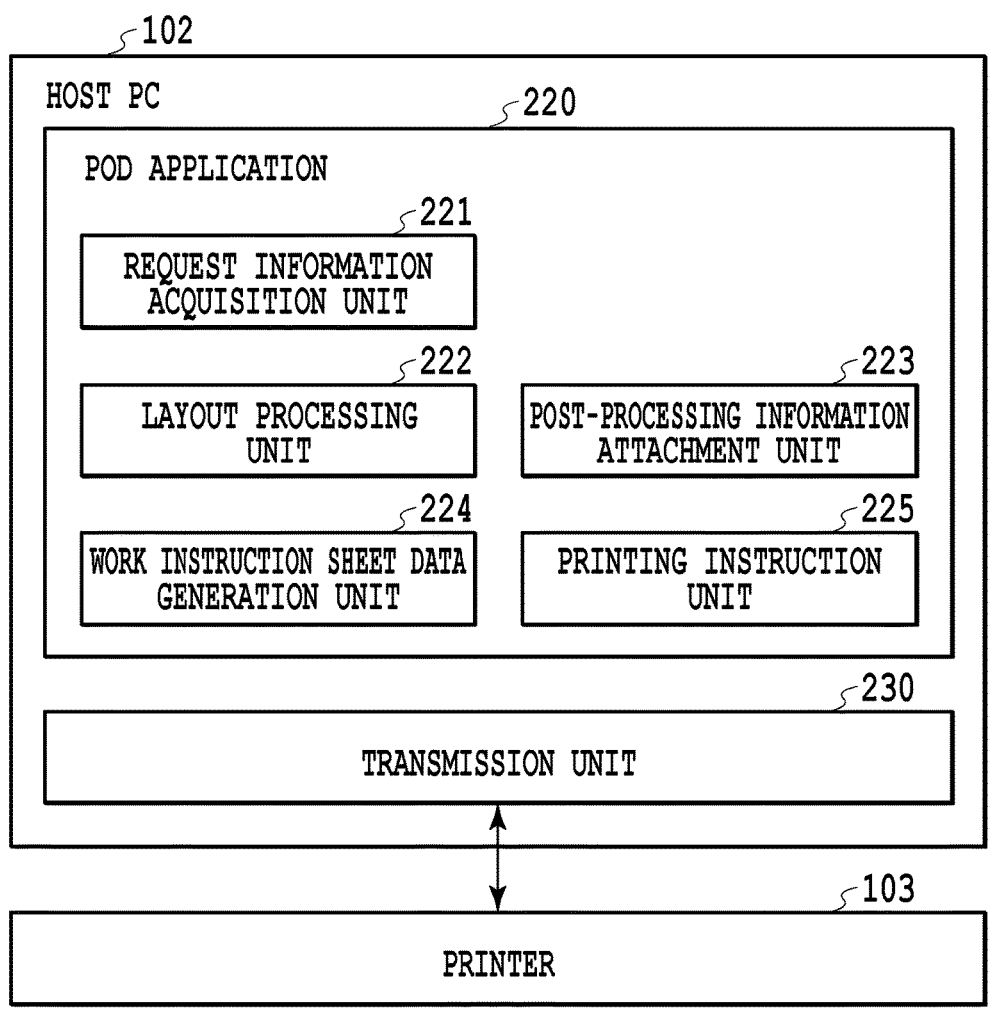
FIG. 3 is a function block diagram showing a software configuration of the host PC.

FIG. 3 is a function block diagram showing a software configuration of the host PC 102. The software module within the host computer 102 is roughly divided into two portions: a POD application 220 and a transmission unit 230. The POD application 220 further includes a request information acquisition unit 221, a layout processing unit 222, a post-processing information attachment unit 223, a work instruction sheet data generation unit 224, and a printing instruction unit 225. The POD application 220 and the transmission unit 230 are implemented by the CPU 202 executing programs stored in the ROM 204 or the HDD 212. In the following, each unit making up the POD application 220 is explained mainly.

The request information acquisition unit 221 acquires request information from the order management server 101 in the file format, such as CSV (Comma-Separated Values) and JDF (Job Definition Format) specified by the international standardizing body CIP4. An example of request information in the CSV format is shown below. In the following example, each item name of the request information is described with a comma in between and after the new line code, the actual data corresponding to each item name is described with a comma in between.

Appointed date of delivery, ID, Client, Subject matter, File, Number of copies, Format, Color, Delivery destination 2016/05/01, 12345678, Taro Irai, materials, Shiryou.pdf, 20, saddle stitch, monochrome, 1-2-3 x-cho y-ku Tokyo Further, the request information acquisition unit 221 receives print data of a product (hereinafter, "product data") uploaded to the order management server 101 by a client along with the request information. The product data is, for example, print data in a predetermined file format, such as PDF (Portable Document Format).

The layout processing unit 222 performs layout processing, such as impositioning, for the product data based on the request information acquired by the request information acquisition unit 221. Here, impositioning refers to laying out pages so that the folded matter has a correct page order in the folding processing in the binding process. In the present embodiment, also for the print data of the work instruction sheet (hereinafter, "work instruction sheet data"), which is generated from the request information, the same impositioning as that applied to the first page of the product data is performed. By performing impositioning processing as described above, the product (work-in-process) after the binding process in accordance with the request and the work instruction sheet for which the same binding process has been performed are piled so that it is made easy to handle them. For example, by performing the printing processing and the saddle stitch processing using the data after the layout processing (after the impositioning processing) of the product data, the printout matter (or work-in-process) in the state of being saddle stitched by both the center-folding processing and the stapling processing is obtained. Further, by performing the printing processing and the saddle stitch processing using the data after the same layout processing has been performed for the work instruction sheet data, the printout matter (for printout matter having only one page, only the center-folding processing is performed and the stapling processing is omitted) in the state of being center-folded is obtained. The center-folded work instruction sheet appears on the same surface as that of the first page of the product, and therefore, it is possible to easily handle them in the piled state. The information on the layout processing (layout information) including impositioning applied to the product data in the layout processing unit 222 is delivered to the next post-processing information attachment unit 223.

The post-processing information attachment unit 223 attaches management information for post-processing (e.g., process management barcode to be read by the stitching machine 104 and the cutting machine 105) to the product data and the work instruction sheet data for which impositioning has been performed by using the above-described layout information.

The work instruction sheet data generation unit 224 generates work instruction sheet data from the request information received from the request information acquisition unit 221. Further, the work instruction sheet data generation unit 224 also generates printing setting information (e.g., sheet specification, instructions of saddle stitch processing performed by the printer 103) for the work instruction sheet data. The generated printing setting information is sent to the printing instruction unit 225 and is made use of as data to be attached to the work instruction sheet data. In the present embodiment, the generation of the work instruction sheet data is performed on the host PC 102 side, but this is not limited. For example, a configuration may be accepted in which the work instruction sheet data is generated in the order management server 101 and the host PC 102 receives the work instruction sheet data in place of the request information.

The printing instruction unit 225 instructs the printer 103 to print the product data to which management information for post-processing is attached by the post-processing information attachment unit 223 based on the request information acquired by the request information acquisition unit 221. At this time, the printing instruction unit 225 also instructs the printer 103 to print the work instruction sheet data generated by the work instruction sheet data generation unit 224. The product data may be printed before or after the work instruction sheet data.

The transmission unit 230 transmits the product data and the work instruction sheet data relating to the printing instructions of the printing instruction unit 225 to the printer 103. It may also be possible for the function of the transmission unit 230 to be incorporated in the POD application 220.

Figure 4:
FIG. 4 is a diagram showing an example of work instruction sheet data.

Next, the work instruction sheet data is explained. FIG. 4 shows an example of work instruction sheet data generated based on request information. Work instruction sheet data 400 shown in FIG. 4 includes each item of "Appointed date of delivery" 401, "Request ID" 402, "Client" 403, "Subject matter" 404, "File" 405, "Number of copies" 406, "Format" 407, "Color" 408, and "Delivery destination" 409. These items are information that a client registers to the order management server 101 at the time of request, or information that the order management server 101 issues for management of product data. An operator checks the contents of each item described in the work instruction sheet, produces a product correctly, and delivers the product. In the following, each item is explained.

In "Appointed date of delivery" 401, the date on which the product in accordance with the request is shipped from the work place where printing and post-processing are performed, which is calculated backward based on the contents that a client inputs to the order management server 101. In "Request ID" 402, for example, a barcode or the like obtained by coding information, such as a unique identification number, to identify the request contents is described. The code indicating the request ID is read at the time of delivery work and used for collation and the like with a delivery slip. In "Client" 403, the name of a client who made the request via the Web service and the like is described. In "Subject matter" 404, the name representing the contents of the product, which a client inputs, is described. An operator uses "Subject matter" to easily recognize the printout matter in accordance with the request. In "File" 405, the file name of the product data that a client uploads to the order management server 101 is described. An operator uses "File" to identify the product data on the operation unit 311 at the time of printing in the printer 103. "Number of copies" 406 is numerical value information indicating how many copies of the product in accordance with the request are necessary and is specified by a client at the time of request. "Format" 407 is information relating to the format (specifications) of the product, such as saddle stitch binding and case binding, and is specified by a client at the time of request. This "Format" 407 is used by an operator to specify the post-processing (e.g. cutting processing) of the printout matter in accordance with the request. Because of this, "Format" 407 only needs to be information capable of specifying the work contents of the post-processing, and therefore, there is a case where a name capable of uniquely specifying a product, such as "business card", is described in place of the name of the post-processing. "Color" 408 is information to specify whether the printing processing of the product in accordance with the request is performed in color or monochrome and is specified by a client at the time of request. For example, even in the case where the product data that is input is created in black and white and it is possible to recognize that the printing should be performed by monochrome printing, there is an occasion to cause a client to explicitly specify the setting of "Color" 408 to avoid erroneous charging. "Delivery destination" 409 is information to specify the delivery destination of the product and is specified by a client at the time of request. An operator arranges delivery of the product to the delivery destination specified in this "Delivery destination" 409. As described above, in the work instruction sheet, information (e.g., information relating to the post-processing, such as cutting, information that is used for the delivery work) and the like used in the work process in the post stage is included.

Figure 5A:
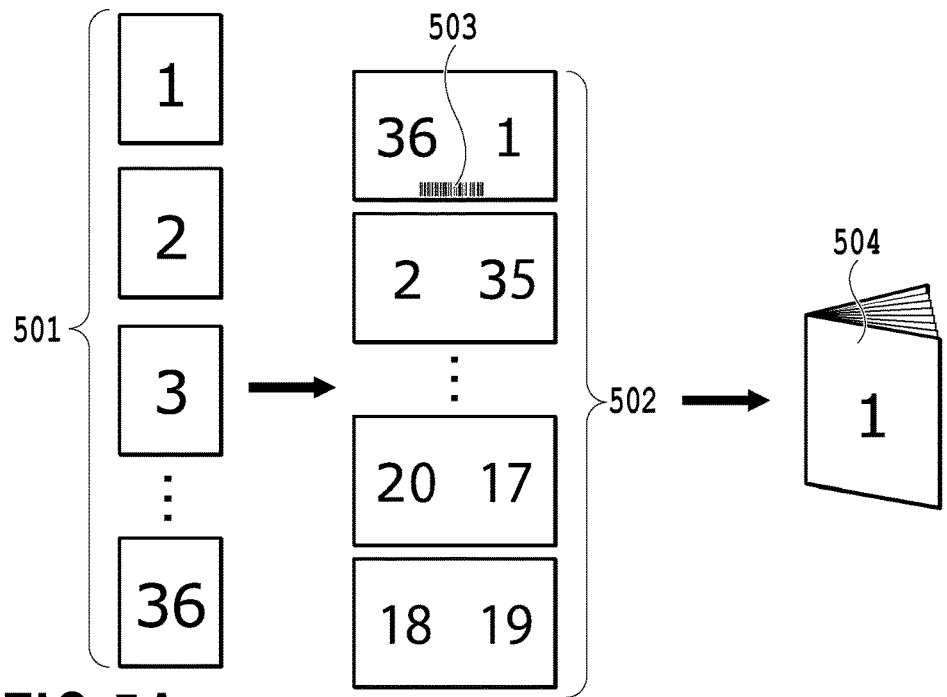
FIG. 5A to FIG. 5C are diagrams explaining a production process in the case where a product for which saddle stitch binding is specified is produced by making use of a printer and a cutting machine.

Following the above, the production process in the case where a product for which saddle stitch binding is specified is produced by making use of the printer 103 and the cutting machine 105 in the POD printing system 100 according to the present embodiment is explained with reference to the drawings. Here, the case is explained where the printer 103 has a saddle stitch function (stapling function and center-folding function). FIG. 5A shows a process until the work-in-process (printout matter) of the product in accordance with the request is output from the printer 103. For product data 501 at the time of reception of the data, impositioning for binding based on the request information is performed by the layout processing unit 222, and thereby, the product data 501 is converted into post-impositioning product data 502. For the post-impositioning product data 502, each page is laid out so that the product of saddle stitch binding is obtained as the results of performing the both-side printing processing, the stapling processing, and the center-folding processing. After this, by the post-processing information attachment unit 223, management information 503 (here, barcode) that is used in the post-processing in the next process is attached to the post-impositioning product data 502. Then, by the printing instruction unit 225, the print job that specifies saddle stitch binding in the printing setting is transmitted to the printer 103 and by performing the stapling processing of a plurality of sheets together for which both-side printing has been performed and further by performing the center-folding processing, printout matter 504 of saddle stitch binding is output from the sheet discharge port (not shown schematically) of the printer 103. At this time, the printout matter 504 passes through the post-processing mechanism (not shown schematically) for saddle stitch binding within the printer 103 and is output from the dedicated sheet discharge port.

Figure 5B:
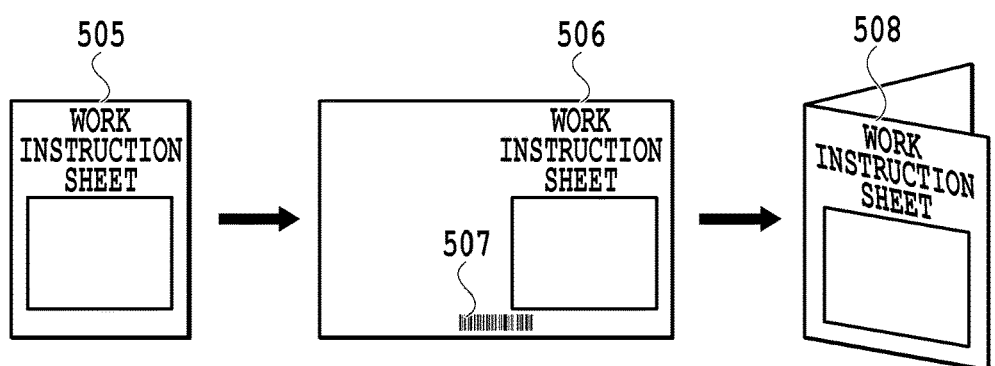

FIG. 5B shows the output process of the work instruction sheet that is output along with the above-described printout matter 504. For work instruction sheet data 505 generated by the work instruction sheet data generation unit 224, the same impositioning as that of the product in accordance with the request is performed by the layout processing unit 222 and the work instruction sheet data 505 is converted into post-impositioning work instruction sheet data 506. The work instruction sheet consists of one page, and therefore, in the post-impositioning work instruction sheet data 506, the page of the work instruction sheet is laid out at the same position of the impositioning position of the first page of the post-impositioning product data 502. After this, the post-impositioning work instruction sheet data 506 is transmitted to the printer 103 following the above-described post-impositioning product data 502 by the printing instruction unit 225 along with the printing setting information whose contents are the same as those of the product data. As a result of this, a work instruction sheet 508 that is saddle stitched (center-folded) like the printout matter 504 is output from the same sheet discharge port (not shown schematically) as that through which the printout matter 504 is output. As described above, in the present embodiment, the work instruction sheet data is output by the same printing settings as the printing settings of the printout matter in accordance with the request and the same processing as that of the printout matter is performed. Due to this, the work instruction sheet is output from the same sheet discharge port as that through which the printout matter in accordance with the request is output. The work instruction sheet does not need to be stapled, and therefore, it is not necessary to perform the completely same printing settings as those of the product data. The printout matter 504 and 508 output from the printer 103 as described above is conveyed to the cutting machine 105 for the processing to cut unnecessary portions.

Further, as a modification example, it may also be possible to perform the saddle stitch binding process by using the stitching machine 104 in place of the saddle stitch binding function of the printer 103. In this case, the management information 503 that is attached to the post-impositioning product data 502 may include information relating to both the information that is used for the saddle stitch processing (stapling processing+center-folding processing) as a first post-processing process and the information that is used for the cutting processing as a second post-processing process. Further, management information 507 whose contents are the same as those of the management information 503 of the post-impositioning product data 502 is attached to the same position as that of the management information 503 for the work instruction sheet data 506 for which impositioning has been performed so that the same folding as that of the printout matter in accordance with the request is also performed in the stitching machine 104. Due to this, it is possible to set the work instruction sheet at the sheet feed port of the stitching machine 104 in alignment with the printout matter of the product in accordance with the request without the need to pull out the work instruction sheet from those output from the printer 103.

Figure 5C:
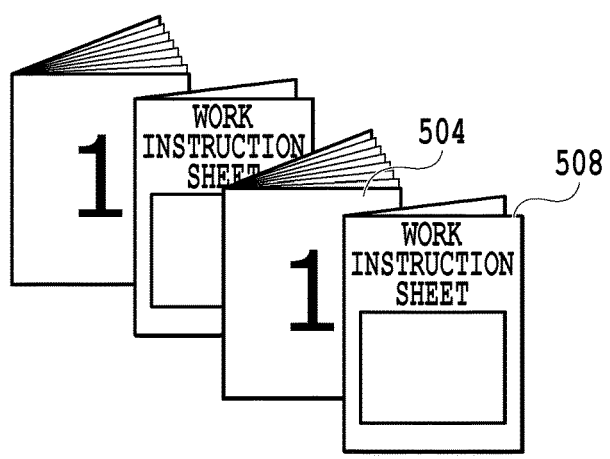

FIG. 5C is a diagram showing the way the printout matter 504 and the work instruction sheet 508 are discharged. As shown schematically, the printout matter 504 in accordance with the request, for which the saddle stitch processing has been performed, and the work instruction sheet 508, for which the center-folding processing similar to the saddle stitch processing of the printout matter 504 has been performed, are output from the common sheet discharge port of the printer 103 and further, the work instruction sheet 508 is discharged onto the printout matter 504. In the case where a plurality of different products is created successively, as shown in FIG. 5C, onto the product, the work instruction sheet relating to the product is discharged so as to pile on the product, and further, another product and the work instruction sheet thereof are discharged in a piled state so as to pile on the previously discharged product and work instruction sheet.

FIG. 6 is a diagram showing an example of a UI screen of the POD application 220. On a UI screen 600 of the POD application 220, information on four items, i.e., "Job ID" 603, "Subject matter" 604, "Device name" 605, and "Status" 606, is displayed in a list. In the list, in one row, information on production instructions to be transmitted to one device is displayed. For example, in the case where business matter that will undergo the production process of printing by the printer 103 and binding by the stitching machine 104 is requested, on the list on the UI screen 600, two rows for the print job and the stitch processing job are displayed and it is made possible to control each job independently of each other.

On the UI screen 600, a "transmit button" 601 is a button to transmit the job in the row selected by a user to the target device (in the present embodiment, the printer 103, the stitching machine 104, and the cutting machine 105). A user selects a job to be transmitted by using a "checkbox" 602. In "Job ID" 603, ID information allocated to each request included in the code described in "Request ID" 402 of the work instruction sheet is displayed. In the case where the same job ID exists across a plurality of rows, each job ID refers to the job of a different process for the same product.

Here, on the UI screen 600, for example, for job ID "00000023", two kinds of job, i.e., a print job that is transmitted to "printer 1" and a stitch processing job that is sent to "stitching machine", are displayed in two rows. In "Subject matter" 604, the name that uniquely identifies the product corresponding to the work instruction sheet is displayed. In "Device name" 605, the name of the device to which each job is transmitted is displayed. Normally, the printer 103 and the post-processing machines 104 and 105 connected with the host PC 102 via the network 106 are displayed in a list, for example, in the format of a combo box and it is made possible for a user to make a change in accordance with the necessity. In "Status" 606, whether or not the target job has already been transmitted to each device is displayed. In the case where "already transmitted" is described, this means that the job has reached the target device. In the case where "not transmitted yet" is described, this means that the job has not been transmitted or the job has not reached the target device. Then, "search window" 607 is used to reduce the number of displayed jobs by searching for specific jobs among the jobs held in the POD application 220. By using this function, for example, it is possible to display only the jobs that have not been transmitted yet in the list.

As described above, in the example of the list display shown in FIG. 6, each job is displayed so that it is possible to control each process of one product separately, but it may also be possible to display all the jobs of the same product in one row so that it is possible to control all the jobs together relating to one product. Further, there may be a processing device other than the "stitching machine" and the "cutting machine" as the post-processing machine.

Figure 7:
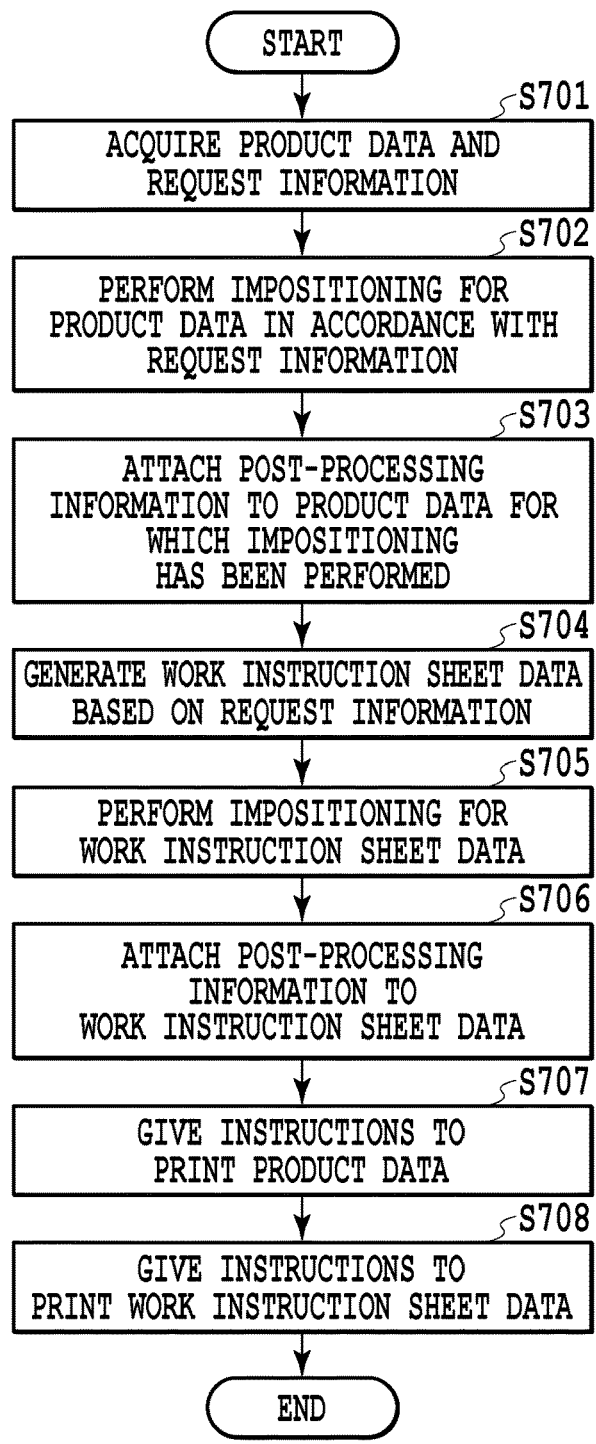
FIG. 7 is a flowchart showing a series of flow in the case where a request to produce a pamphlet for which saddle stitch binding is specified as a product is processed according to a first embodiment.

Next, the process from acquisition of product data and the like in accordance with a request until production instructions are given to each device by the POD application 220 of the present embodiment is explained in time series. FIG. 7 is a flowchart showing a series of flow in the case where a request for a pamphlet as a product for which saddle stitch binding is specified is processed according to the present embodiment. This series of processing is implemented by the CPU 202 of the host PC 102 reading a program stored in the ROM 204 or the HDD 212, loading the program onto the RAM 203, and executing the program.

At step 701, the request information acquisition unit 221 acquires product data and request information thereon from the order management server 101. Next, at step 702, the layout processing unit 222 performs impositioning processing (i.e., impositioning processing for saddle stitch binding) for the product data in accordance with information on the format and specifications of the product (in this example, "saddle stitch" corresponding to "Format" 407 described previously) included in the acquired request information. It may also be possible to perform image processing, such as color conversion and adjustment of a margin area, at this step in accordance with the necessity, in addition to the impositioning processing to change the arrangement of pages. For example, in the case where "monochrome" is specified in "Format" in the request information although the acquired product data is full-color data, at this step, processing to convert the product data into monochrome data is also performed. Then, at step 703, the post-processing information attachment unit 223 attaches management information for post-processing (e.g., barcode to be read by the cutting machine 105), which is used in the next process, to the product data for which the impositioning processing for saddle stitch binding has been performed.

Next, at step 704, the work instruction sheet data generation unit 224 generates work instruction sheet data based on the request information acquired at step 701. At this time, printing setting information to be attached at step 708, to be described later, is also generated. The work instruction sheet data is generated by referring to a prototype image file prepared and held in advance and by embedding characters in the image file by using the request information acquired from the order management server 101. The generated work instruction sheet data is delivered to the layout processing unit 222 and the printing setting information is delivered to the printing instruction unit 225.

Then, at step 705, the layout processing unit 222 performs the impositioning processing whose contents are the same as those of the impositioning processing performed for the product data (i.e., impositioning processing for saddle stitch binding) for the work instruction sheet data. At step 706 that follows, the post-processing information attachment unit 223 attaches the management information for post-processing, whose contents are the same as those attached to the product data in accordance with the request, to the work instruction sheet data for which the impositioning processing has been performed.

At step 707, the printing instruction unit 225 attaches the printing setting information to perform the saddle stitch processing for the post-impositioning product data, to which the management information for post-processing has been attached at S703, and instructs the printer 103 to perform printing. The product data at the time of giving printing instructions may remain in the data format at the time of reception of the data (e.g., PDF format) or may be data converted into PDL (Page Description Language) by the printer driver, not shown schematically. It may be possible to determine the data format in which the product data is transmitted in accordance with the function and the like possessed by the printer 103.

At step 708, the printing instruction unit 225 attaches the printing setting information, which is the same as that attached to the product data, to the post-impositioning work instruction sheet data to which the management information for post-processing has been attached, and instructs the printer 103 to perform printing. By giving instructions to print the work instruction sheet data after giving instructions to print the product data, the center-folded work instruction sheet is output in the state of being piled on the saddle stitched printout matter in accordance with the request. That is, the product in accordance with the request and the work instruction sheet corresponding to the product are output as a set in association with each other. Due to this, it is made easy for an operator to recognize the subject matter and the contents of the printout matter in accordance with the request.

According to the present embodiment, in the case where a request for a product, such as a pamphlet, specifying saddle stitch binding is made by on-demand printing and the like, the product in accordance with the request and the work instruction sheet corresponding to the product are printed and output in a combination of a pair. As a result of this, the burden of an operator in collation between the work instruction sheet and the work-in-process is reduced, and therefore, it is possible to suppress a human mistake from occurring.

Second Embodiment

Application of the method of the first embodiment to the case where the final products are produced by laying out a plurality of products, for example, such as business cards and tickets, on one sheet and then by performing cutting processing will increase the number of work instruction sheets too much. Consequently, an aspect is explained as a second embodiment in which one piece of print data is generated in which impositioning processing is performed so that a product and a work instruction sheet corresponding to the product are associated with each other in the case where business cards or the like are produced. Due to this, even in the case such as described above also, it is made possible to output the product in accordance with the request and the work instruction sheets in the necessary and sufficient number from the sheet discharge port of the cutting machine 105 in the state where both are associated with each other. Explanation of the portions in common to those of the first embodiment is omitted or simplified and in the present embodiment, different points are explained mainly.

Figure 8:
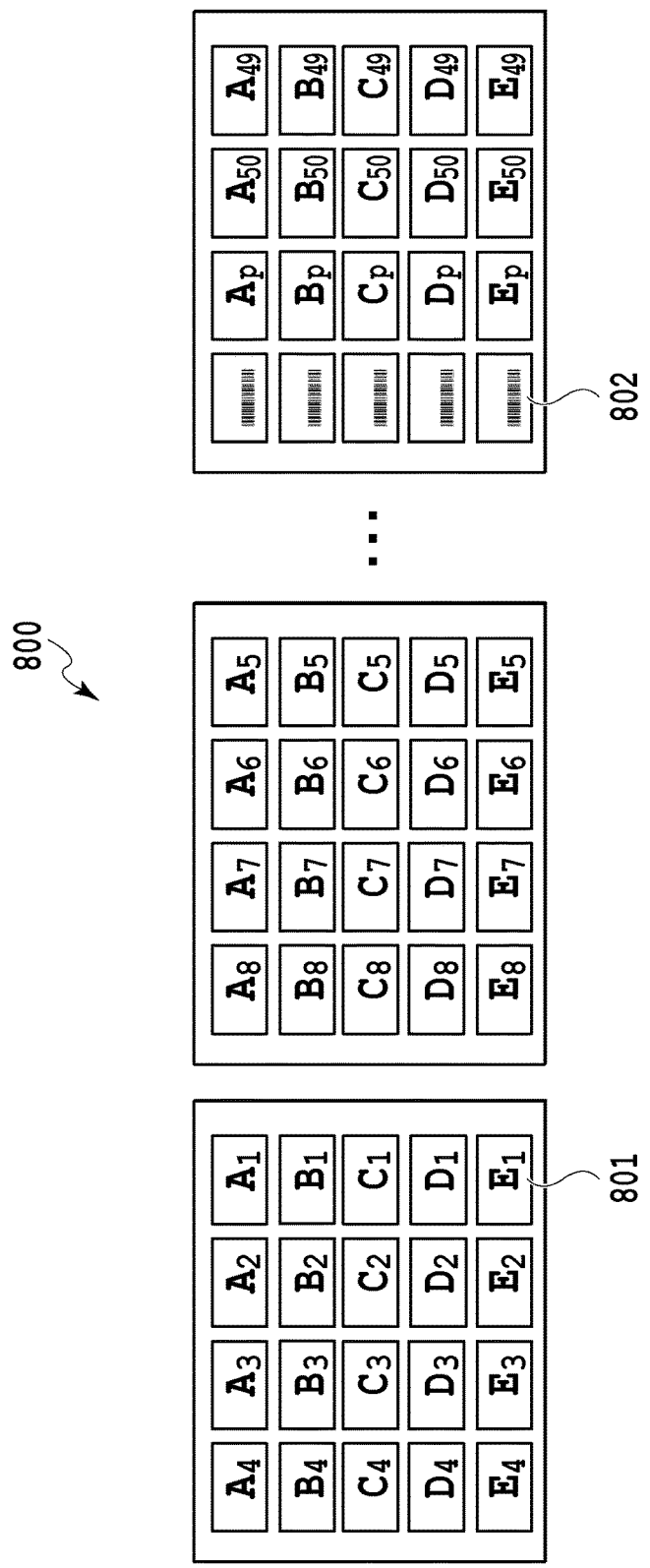
FIG. 8 is a diagram showing an example of post-impositioning product data in a second embodiment.

In the following, explanation is given by taking the case as an example where five kinds of business card "A to E", each lot consisting of fifty business cards, are produced. FIG. 8 is a diagram showing an example of post-impositioning product data in which work instruction sheet images are arranged in part of the product data (print data of business card) in accordance with the request, which is sent to the printer 103 in the present embodiment. In the case where "business card" is specified in "Format" in the request information, the layout processing unit 222 refers to the sheet size to be used and the performance information on the cutting machine 105, which is held separately, and performs imprinting so that the products and the work instruction sheets in the necessary and sufficient number are associated with each other. Specifically, as shown in FIG. 8, the product data and the work instruction sheet data are combined and impositioning is performed so that the products and the work instruction sheet images are put side by side on one of pages of print data 800 after combination. In the scene in which the five kinds of business card, each lot consisting of fifty business cards, are produced, a business card image 801 is arranged in fours in the long-side direction of an A3-sized page and impositioning is performed for thirteen pages in total. In this case, the second business card image from the right on the thirteenth page is the fiftieth business card image. Consequently, at the margin portion on the left side of the page, work instruction sheet images 802 are arranged so as to be put side by side with spare business card images (Ap to Ep). As described above, by performing impositioning so that each kind of business card and the one corresponding work instruction sheet are put side by side in association with each other on the same page, in the case where business cards, each of which is the product, are output, a state is brought about where the one work instruction sheet corresponding to each business card is piled on the top of each product. The spare business card images (Ap to Ep) are arranged because a margin corresponding to two business cards is left, and therefore, the spare business cards may be omitted. Further, the arrangement shown in FIG. 8 is an example and the arrangement direction of the business card images and the positions of the work instruction sheet images are determined in accordance with the sheet size and the performance of the post-processing machine. For example, it is supposed that there is a production request for three kinds of tickets "x, y, z," each of which consists of fifteen tickets and which is one size larger than the business card. In this case, depending on the specifications of the cutting machine 105, for example, the fifteen images of the "x" ticket are put side by side within an A3-sized page and then the work instruction sheet image corresponding to the ticket is arranged, and the same is done for the images of the other tickets "y" and "z". In any way, what is required is the arrangement that will bring about the state where the corresponding work instruction sheet is piled on the product in the case where the product obtained by the cutting processing is output from the cutting machine 105.

Figure 9:
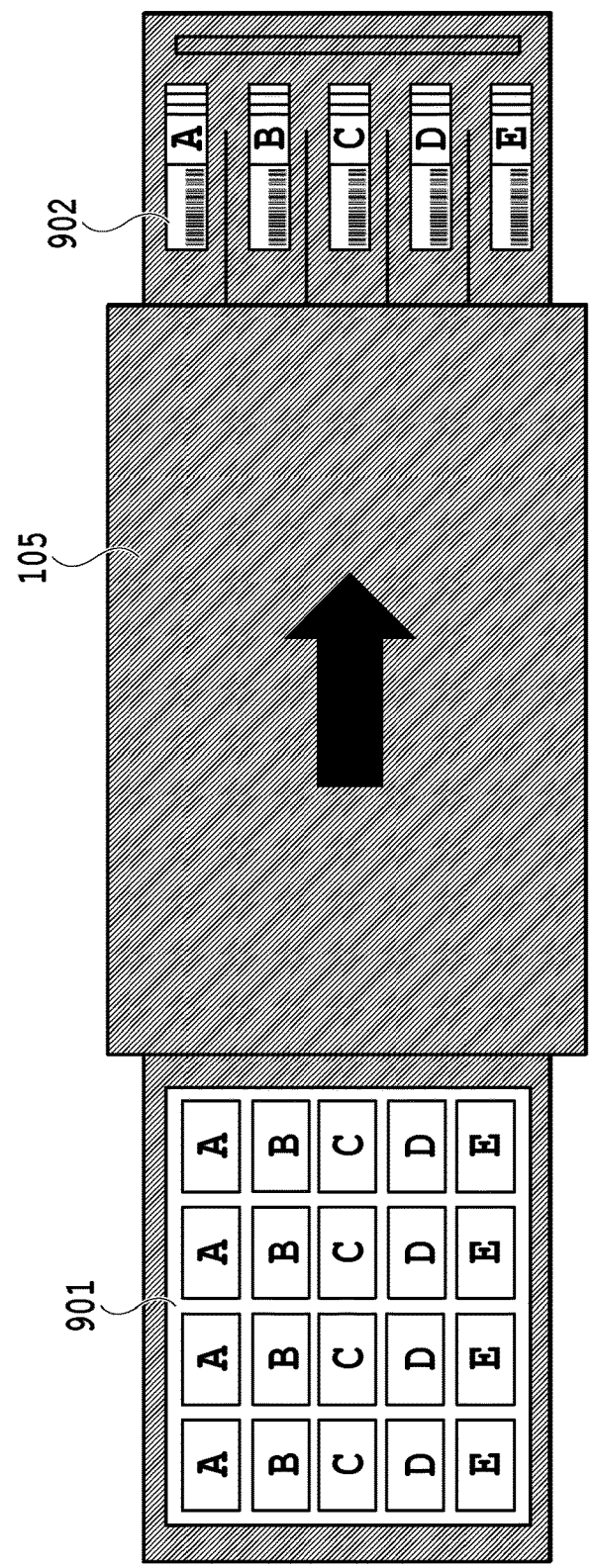
FIG. 9 is a diagram showing the way printout matter in which business cards and work instruction sheets are laid out on the same page is subjected to cutting processing by the cutting machine and output from a sheet discharge port.

FIG. 9 is a diagram showing the way the cutting machine 105 performs cutting processing for the printout matter in which the business cards and the work instruction sheets are laid out on the same page and outputs the printout matter from the sheet discharge port. Printout matter 901 that is fed to the cutting machine 105 is obtained by printing the print data 800 after the combination in FIG. 8. An operator brings the printout matter 901, which is one set of thirteen sheets, output from the printer 103 to the cutting machine 105 and sets the printout matter 901 on the sheet feed cassette. Then the cutting machine 105 performs cutting processing in order from the first sheet of the printout matter 901 and discharges the business cards in order from the rightmost business card of the printout matter 901. After the cutting processing is performed for the thirteenth sheet of the printout matter 901 (page on which the work instruction sheet is printed), the work instruction sheet (802) is discharged last. A product 902 is the printout matter 901 for which the cutting processing has been performed in order and which has been discharged. In this example, the five kinds of business card "A to E" are output, which are each the product consisting of fifty-one business cards and onto which the work instruction sheet in the business card size is output. In the case where the printer 103 outputs the printout matter 901 facedown, an operator places the printout matter 901 output from the printer on the sheet feed cassette of the cutting machine 105 in the state where the surface and back side are reversed. On the other hand, in the case where the printer 103 outputs the printout matter 901 faceup, by printing the print data 800 in the reverse order and in the state where the surface faces upward, it is possible for an operator to set the printout matter 901 on the cutting machine without the need to reverse the surface and back side of the printout matter 901 output from the printer. Further, in the case of a system made up so that the printout matter is automatically conveyed from the printer 103 to the cutting machine 105 by a conveyer and the like, it may also be possible to automatically feed the business card one by one from the printer 103 to the cutting machine 105 in place of a set of thirteen business cards.

Figure 10:
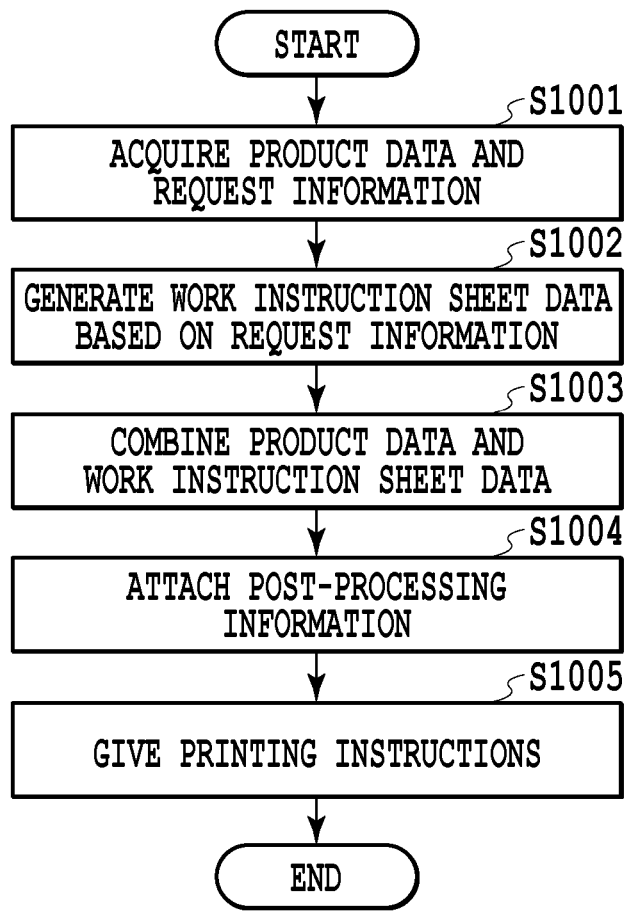
FIG. 10 is a flowchart showing a series of flow in the case where a request to produce business cards as a product is processed according to the second embodiment.

FIG. 10 is a flowchart showing a series of flow in the case where a request for business cards as a product by the POD application 220 is processed. This series of processing is implemented by the CPU 202 of the host PC 102 reading a program stored in the ROM 204 or the HDD 212, loading the program onto the RAM 203, and executing the program.

At step 1001, the request information acquisition unit 221 acquires product data and request information thereon from the order management server 101. At step 1002 that follows, the work instruction sheet data generation unit 224 generates work instruction sheet data based on the acquired request information.

Next, at step 1003, the layout processing unit 222 combines the product data (image data of business card) in accordance with the request and the work instruction sheet data generated at step 1002 in accordance with the contents (here, "business card") specified in "Format" in the acquired request information. For example, in the case where the five kinds of business card described previously, each lot consisting of fifty business cards, are produced, print data is generated in which each business card image is arranged in fours on the first to twelfth pages and on the thirteenth page, each business card image is arranged in threes (in the case where there is a spare) and one work instruction sheet image is arranged for each kind of business card. In the case where there is no spare, on the thirteenth page, each business card image is arranged in twos and one work instruction sheet image is arranged for each kind of business card. Due to this, one piece of print data in which impositioning processing is performed so that the products and the work instruction sheets thereof obtained by cutting processing are associated with each other.

At step 1004, the post-processing information attachment unit 223 attaches management information for cutting processing to the print data obtained by the combination processing. Then, at step 1005, the printing instruction unit 225 instructs the printer 103 to print the print data after the combination to which the management information for post-processing is attached.

In this manner, from the printer 103, as shown in FIG. 9, each business card and the work instruction sheet corresponding thereto are output in a set.

According to the present embodiment, in the case where a plurality of products in accordance with a request is obtained from one piece of printout matter by performing cutting processing, it is possible to improve work efficiency and to suppress a human mistake from occurring by reducing the burden of an operator in collation between a work instruction sheet and a work-in-process.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to improve work efficiency and to suppress a human mistake from occurring by reducing the burden of an operator in collation between a work instruction sheet and a work-in-process (product) in on-demand printing and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-158618, filed Aug. 12, 2016, and No. 2017-129142, filed Jun. 30, 2017, which are hereby incorporated by reference wherein in their entirety.

What is claimed is:

1. A printing control apparatus comprising:
a memory for storing a computer program; and
a processor for executing the computer program to:
perform layout processing that generates print data on which data of products and data of a work instruction sheet are laid out based on information on first post-processing to be performed for a plurality of printout sheets that are printed using the generated print data, wherein the work instruction sheet is used in work in a post stage; and
instruct a printer to print the generated print data on the plurality of printout sheets, wherein
in the layout processing, the data of the products and the data of the work instruction sheet are laid out based on an order that the products and the work instruction sheet are discharged from the first post-processing, so that the work instruction sheet discharged from the first post-processing is output on the products discharged from the first post-processing in a piled state as the results of performing the first post-processing for the plurality of printout sheets on which the generated print data is printed.

2. The printing control apparatus according to claim 1, wherein
the first post-processing is saddle stitch processing or cutting processing.

3. The printing control apparatus according to claim 1, wherein
the first post-processing is saddle stitch processing, and
in the layout processing, the data of the products and the data of the work instruction sheet are laid out based on the order that the products and the work instruction sheet are discharged from the saddle stitch processing, so that the work instruction sheet after the saddle stitch processing is output on the products after the saddle stitch processing in a piled state at a discharge port for the saddle stitch processing, and
wherein the products after the saddle stitch processing are obtained by performing both center-folding processing and stapling processing as the saddle stitch processing for the plurality of printout sheets on which the data of products are printed, and
wherein the work instruction sheet after the saddle stitch processing is obtained by performing center-folding processing.

4. The printing control apparatus according to claim 3, wherein
the work instruction sheet includes information relating to work in a further post stage of the first post-processing.

5. The printing control apparatus according to claim 4, wherein
the work instruction sheet includes information relating to cutting processing for the products after the saddle stitch processing and/or information relating to delivery work.

6. The printing control apparatus according to claim 1, wherein in the layout processing, management information to be used in work in a further stage of the first post-processing is further attached to the print data.

7. The printing control apparatus according to claim 1, wherein
the first post-processing is cutting processing, and
in the layout processing, a plurality of images of the products and an image of the work instruction sheet are laid out based on the order that the products and the work instruction sheet are discharged from the cutting processing, so that the work instruction sheet after the cutting processing is output on the products after the cutting processing in a piled state.

8. The printing control apparatus according to claim 1, wherein
the products are business cards,
the first post-processing is cutting processing, and
in the layout processing, print data of a first page on which a predetermined number of images relating to the business card are arranged and an image relating to a work instruction sheet is not arranged, and print data of a second page on which images relating to the business card and an image relating to the work instruction sheet are arranged are generated so that the work instruction sheet after the cutting processing is output on the business cards after the cutting processing in a piled state.

9. A printing control method comprising:
performing layout processing that generates print data on which data of products and data of a work instruction sheet are laid out based on information on first post-processing to be performed for a plurality of printout sheets that are printed using the generated print data, wherein the work instruction sheet is used in work in post stage; and
instructing a printer to print the generate print data on the plurality of printout sheets, wherein
in the layout processing, the data of the products and the data of the work instruction sheet are laid out based on an order that the products and the work instruction sheet are discharged from the first post-processing, so that the work instruction sheet discharged from the first post-processing is output on the products discharged from the first post-processing in a piled state as the results of performing the first post-processing for the plurality of printout sheets on which the generated print data is printed.

10. A non-transitory computer readable storage medium storing a program for causing a computer to:
perform layout processing that generates print data on which data of products and data of a work instruction sheet are laid out based on information on first post-processing to be performed for a plurality of printout sheets that are printed using the generated print data, wherein the work instruction sheet is used in work in a post stage; and
instruct a printer to print the generated print data on the plurality of printout sheets, wherein
in the layout processing, the data of the products and the data of the work instruction sheet are laid out based on an order that the products and the work instruction sheet are discharged from the first post-processing, so that the work instruction sheet discharged from the first post-processing is output on the products discharged from the first post-processing in a piled state as the results of performing the first post-processing for the plurality of printout sheets on which the generated print data is printed.

11. The non-transitory computer readable storage medium according to claim 10, wherein
the first post-processing is saddle stitch processing or cutting processing.

12. The non-transitory computer readable storage medium according to claim 10, wherein
the first post-processing is saddle stitch processing, and
in the layout processing, the data of the products and the data of the work instruction sheet are laid out based on the order that the products and the work instruction sheet are discharged from the saddle stitch processing, so that the work instruction sheet after the saddle stitch processing is output on the products after the saddle stitch processing in a piled state at a discharge port for the saddle stitch processing, and
wherein the products after the saddle stitch processing are obtained by performing both center-folding processing and stapling processing as the saddle stitch processing for the plurality of printout sheets on which the data of products are printed, and
wherein the work instruction sheet after the saddle stitch processing is obtained by performing center-folding processing.

13. The non-transitory computer readable storage medium according to claim 12, wherein
the work instruction sheet includes information relating to work in a further post stage of the first post-processing.

14. The non-transitory computer readable storage medium according to claim 13, wherein
the work instruction sheet includes information relating to cutting processing for the products after the saddle stitch processing and/or information relating to delivery work.

15. The non-transitory computer readable storage medium according to claim 10, wherein
in the layout processing, management information to be used in work in a further stage of the first post-processing is further attached to the print data.

16. The non-transitory computer readable storage medium according to claim 10, wherein
the first post-processing is cutting processing, and
in the layout processing, a plurality of images of the products and an image of the work instruction sheet are laid out based on the order that the products and the work instruction sheet are discharged from the cutting processing, so that the work instruction sheet after the cutting processing is output on the products after the cutting processing in a piled state.

17. The non-transitory computer readable storage medium according to claim 10, wherein
the products are business cards,
the first post-processing is cutting processing, and
in the layout processing, print data of a first page on which a predetermined number of images relating to the business card are arranged and an image relating to a work instruction sheet is not arranged, and print data of a second page on which images relating to the business card and an image relating to the work instruction sheet are arranged are generated so that the work instruction sheet after cutting processing is output on the business cards after the cutting processing in a piled state.

\* \* \* \* \*